Nov. 6, 1962 H. E. CAMPBELL 3,062,599
CARBON BEARINGS WITH MOLYBDENUM DISULPHIDE INSERTS
Filed Nov. 27, 1959

INVENTOR.
HUGH E. CAMPBELL
BY
ATTORNEY

United States Patent Office 3,062,599
Patented Nov. 6, 1962

3,062,599
CARBON BEARINGS WITH MOLYBDENUM DISULPHIDE INSERTS
Hugh E. Campbell, Scotia, N.Y., assignor to General Electric Company, a corporation of New York
Filed Nov. 27, 1959, Ser. No. 855,839
1 Claim. (Cl. 308—239)

The invention described herein relates to bearings and more particularly to a combined thrust and sleeve bearing designed for operation in both normal and low humidity atmospheres.

The increased use of rotating equipment under conditions of low humidity sometimes requires that bearings be lubricated by a solid compound in contradistinction to oils, greases, or other conventional viscous lubricants. In one known installation, a motor is required to operate submerged in a tank of liquid fuel at high altitudes. The fuel effectively lubricates the motor bearings when being pumped from the tank but since motor operation is necessary after exhaustion of the fuel, the rotating parts become starved of lubricant and the friction resulting from operation ultimately causes extreme wear or destruction of the motor.

A complicating factor in those situations where equipment operation is not carried out while submerged in a fuel and where oil lubricants are not desired for any one of a number of reasons, the lubricant used in lieu thereof must be capable of permitting operation of rotating parts under conditions of both high and low humidity. Many lubricants may be available for performnig this function, but trouble usually is encountered in the selection of the material comprising the main body of the bearing. A metal obviously is not suitable because of the friction generated during operation. Carbon or graphite materials perform very satisfactorily in high humidity environments because of the lubrication provided by water vapor in the air. However, when the carbon is subjected to the action of a rotating part under conditions of low humidity where only slight lubrications from water vapor is available, the carbon dusts away very rapidly thus creating large clearances between the shaft and the bore of the carbon bearing so that likelihood of destruction of the rotating equipment is very great.

The prior art teaches the use of solid lubricants for lubricating the shafts in rotating equipment and one patented design utilizes sulphur placed in intimate contact with the outer surface of a metal shaft, so that as the shaft rotates in a mica bearing shell, the sulphur is caused to melt and flow between the shaft and mica for providing a lubricating film to the exposed shaft surface. However, when sulphur is subjected to heat in the presence of air, sulphur dioxide and some sulphur trioxide, which is an anhydride of sulphuric acid, is formed which causes corrosion and pitting of the steel shaft. Moreover, the sulphur is readily consumed and in the usual situation, also, cannot serve a bearing support function.

In another patented arrangement, a thrust bearing comprising wood having grooves formed in appropriate parts of the surface, are filled with babbitt and the complete bearing then impregnated with oil such that when the bearing is operated, the oil is permitted to bleed from the wood over the babbitt surface to provide a degree of lubrication. It is evident that dismantling of the bearing at periodic intervals is necessary to reimpregnate the wood with additional lubricant. Also, wood is not a stable material at elevated temperatures and therefore is subjected to charring when heated. In view of the hydroscopic characteristics of wood, the internal diameter of the bearing changes with variation in moisture content, thereby causing different clearances between the shaft and the load carrying surface of the bearing.

The primary object of my invention therefore is to provide an improved thrust and sleeve bearing capable of providing extended operation under both normal and low humidity conditions for extended periods of time.

In carrying out my invention, I eliminate the disadvantages of the prior art by providing a combined sleeve and thrust bearing consisting essentially of a material acting in conjunction with water vapor to provide a lubricating film on a shaft adapted for rotation therein when operated under normal humidity conditions. To permit operation in low humidity atmospheres, a solid body of lubricating material is located on the inner surface of the sleeve bearing for depositing a thin film of lubricant on the shaft when the amount of water vapor present cannot carry out this function. Preferably, the sleeve bearing is combined with a thrust bearing having a similar solid lubricant disposed in the thrust transmitting surfaces. In practicing my invention, it will occur to those skilled in the art that the solid lubricant may assume many different forms and that its primary function is one of lubricating the parts under conditions where humidity alone is not sufficient to furnish the desired degree of lubrication.

While the specification concludes with a claim particularly pointing out and distinctly claiming the subject matter which I regard as my invention, it is believed the invention will be better understood from the following description taken in connection with the accompanying drawing in which:

Figure 1:
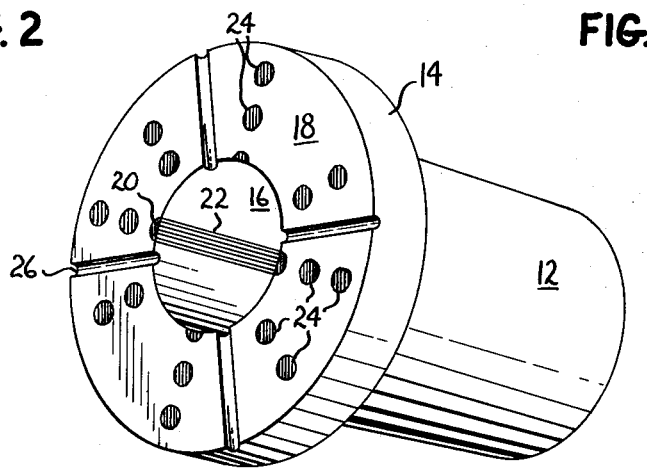
FIGURE 1 is a perspective view of a combined sleeve and thrust bearing having solid inserts capable of providing a lubricating film on a rotating member.

Referring now to the drawing wherein like reference characters designate like or corresponding parts throughout the several views, the combined sleeve and thrust bearing shown in FIGURE 1 comprises an integral assembly of a sleeve bearing 12 and a thrust bearing 14. The assembly is equipped with a central bore 16 for accepting a shaft and the exposed surface 18 of the thrust bearing is designed for transmitting thrust loads imposed thereon by a thrust runner (not shown) to a firm support in which the assembly would be mounted. The main body of the bearing assembly is constructed essentially of graphite, electrographite or other suitably bonded carbon materials. The thickness of the sleeve bearing walls is selected in accordance with the radial loads to be imposed thereon by a shaft, and likewise, the thrust bearing is made sufficiently thick to transmit thrust forces to the supporting structure in which the thrust bearing would be securely mounted.

As used herein, the term normal humidity means humidity conditions wherein one grain or more of water vapor is present in one cubic foot of air. Low humidity means air having less than one grain per cubic foot.

When such a bearing is operated in normal humidity atmospheres, the lubricant consists essentially of water vapor which acts with the carbon or graphite to present a bearing surface substantially nonresistant to movement of similar parts thereon. Some of the carbon from the bearing is transferred to the shaft surface which also combines with water vapor to provide a lubricating film thereon. Therefore, when the shaft is operated in the bearing, only minimum friction exists between them.

The most likely theory by which such lubricity is believed obtainable is that water molecules constituting the water vapor in high humidity air, enter crystalline spaces of the graphite lattice to provide a smooth surface such that duplicate graphite plates having their surfaces permeated with water vapor readily slide with respect to each other when placed in intimate contact. When cleavage of the graphite crystals occurs, certain valence bonds provide attraction for other crystals of similar construction. Water molecules have characteristics of being able to satisfy the valence bonds and when the water molecules therefore are brought into contact with the graphite, they attach themselves to the graphite crystals and permit objects to be moved thereon without seizure. In operating a bearing, so long as the valence bonds are satisfied on both the bearing and shaft surfaces, the physical effect is one of lubricity and unrestricted operation can be carried out without concern for undue wear which otherwise would be caused by frictional forces.

However, when the amount of water molecules available for satisfying the valence bonds decreases below optimum values, the graphite crystals on the surface tend to provide friction to the rotating parts and wear of the weaker graphite material commences, with the wear taking place in proportion to the reduction of water molecules on the graphite crystals. The latter condition is that which exists when the absolute humidity in air commences decreasing below approximately one grain per cubic foot. To permit operation of the bearing when sufficient water molecules are not available, inserts of solid substances are positioned in the graphite material for applying a lubricating film to a shaft surface presented to the inner walls of the bearing.

In the embodiments shown, appropriate grooves 20 are milled in the inner surface of the sleeve bearing bore and of a size sufficient to accept inserts of molybdenum disulphide 22. The inserts preferably extend the axial length of the bearing and are spaced at predetermined intervals around the inner peripheral surface of the bore. In order to provide a smooth internal surface, the molybdenum disulphide inserts are then machined to the same diameter as the bore to permit operation of a shaft within the bore of the bearing. In lieu of using four equally spaced inserts, it will be apparent to those skilled in the art that a lesser or greater number may be used depending on the solid lubricant used for treating the shaft, and also, each insert may be broken and staggered with respect to other inserts throughout the length of the bearing. Obviously, they may be made of different designs. The objective of such an arrangement is to provide a bearing construction wherein the molybdenum disulphide or other solid substance will provide a thin lubricating film along the complete length of a shaft adapted for rotation within the bearing. In view of this, the inserts may be disposed in any fashion, including a helically designed insert for providing a lubricating film along the complete length of that portion of the shaft within the bearing.

Figure 2:
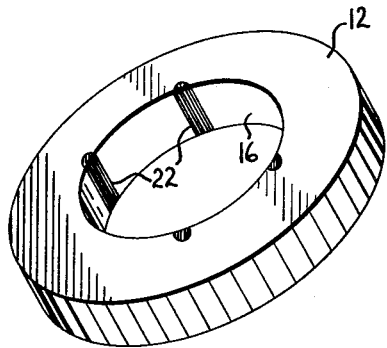
FIGURE 2 illustrates the disposition of solid lubricant inserts in a portion of a sleeve bearing.
Figure 3:
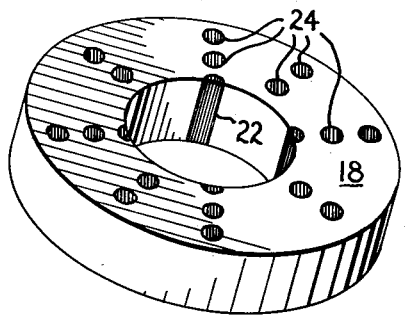
FIGURE 3 shows the staggered relationship of solid lubricant inserts in a thrust bearing.

In order to provide a lubricating film on the surface of a thrust runner (not shown) adapted for engagement with the thrust bearing surface 18 shown in FIGURES 1 and 3, the inserts 24 are located in a direction perpendicular to the thrust bearing surface. As is evident from the illustration in the drawing, each insert constitutes a very small portion of the total thrust bearing surface available to the thrust runner. However, since it is highly desirable to have a lubricating film on the complete surface of the thrust runner, the inserts are staggered radially with respect to each other so that as the thrust runner rotates, overlapping of the inserts will cause deposition of a lubricating film to the thrust runner surface.

In view of the above, it will be evident that those portions of a shaft arranged within the bore of the sleeve portion of the combined bearing will be covered with a thin lubricating film of molybdenum disulphide when the bearing is operated under low humidity conditions. Likewise, a thrust runner adapted for engagement with the thrust surface 18 will have a similar film deposited on its surface. The action performed by the molybdenum disulphide is very similar to that performed by the water molecules disposed on the bearing surface under high humidity conditions. The molybdenum disulphide displays a crystalline structure very similar to graphite in that molybdenum atoms are spaced in a hexagonal latticework arranged in layers. Sulphur atoms spaced between the layers serve the same function as water molecules uniformly disposed on the surface of graphite. The sulphur atoms are chemically part of the molybdenum disulphide and therefore are held firmly in position and are not lost under conditions of either normal or low humidity.

During operation, when the bearing changes from a normal to a low humidity environment, the loss of lubrication resulting from transfer of water molecules to the air, is replaced by molecules of molybdenum disulphide from the inserts in the bearing. Such molybdenum disulphide molecules effectively provide a thin lubricating film on the shaft surface which minimizes wear of the carbon. As pointed out above, if the molybdenum disulphide did not protect the carbon of the bearing, the frictional forces generated between the shaft and carbon surface would accelerate bearing wear at such a high rate that failure would result within a short time. It has been found that when a bearing of the type disclosed herein is moved from an atmosphere of low humidity to one of normal humidity and vice versa that the different lubricants applied to the shaft do not interfere with each other and as a result smooth performance with minimum wear takes place.

Since the carbon-molybdenum disulphide bearing is not completely immune to wear, appropriate slots 26 are formed in the thrust bearing surface for gathering any loose particles that may become separated from the bearing components. Obviously, these grooves may be of different configuration and disposed in a position other than at right angles to the shaft. Likewise, at least one of such slots may extend the length of the sleeve bearing bore.

Substitute materials for the carbon or graphite may comprise any product capable of permitting establishment of a lubricating film of water vapor on the bearing surface. Such products may comprise talc, boron nitride, and the like. In view of the availability of solid compounds having an ability to lubricate metallic and other surfaces, substitutes for molybdenum disulphide may be resorted to although the latter has proven successful in use. Such alternative compounds consist of metals used in combination with those elements in the halide series. Lead iodide, lead chloride, cadmium iodide, sodium pyrophosphate, and compounds of similar nature effectively may be used. Sulphide of silver and copper also may be employed although they are not as effective as the molybdenum disclosed in this application. In those instances where the bearing is required to operate in a liquid, such as fuel, it is evident that the materials selected must not be soluble therein. They must be capable of serving a lubricating function, have low wear rates, and operate under dry conditions. Another important property resides in the good adherence of such compounds to a metal surface in addition to providing low shear strength. They must be stable throughout a wide range of temperatures.

Figure 4:
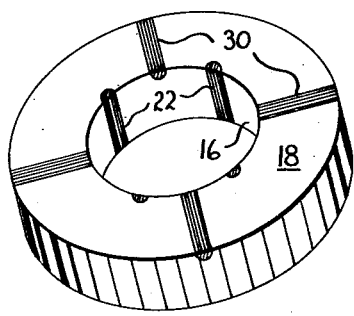
FIGURE 4 is a modification of the combined sleeve and thrust bearing illustrated in FIGURE 1.

In the modification shown in FIGURE 4, instead of utilizing a plurality of inserts located at right angles to the bearing surface, the inserts 30 are positioned at right angles with respect to the bore of the bearing, and operation then follows in much the same way as for a sleeve bearing wherein the inserts extend the complete axial length of the bearing.

In view of the above, it will be evident that many modfications and variations are possible in light of the above teachings. It therefore is to be understood that within the scope of the appended claims that the invention may be practiced other than as specifically described.

What I claim as new and desire to obtain by Letters Patent of the United States is:

A combined thrust and sleeve bearing comprising a cylindrical bearing shell consisting essentially of carbon and having a plurality of molybdenum disulphide inserts disposed axially along the inner surface thereof, said inserts being machined after insertion to provide the maximum area of surface contact to a shaft adapted for rotation therein, a thrust bearing surface on one end of said shell having a flat smooth outer surface and of a radial depth sufficient to transmit thrust loads to a supporting member, and a plurality of molybdenum disulphide inserts embedded axially in said thrust bearing surface and displaced both radially and circumferentially with respect to each other, so that when a thrust runner and shaft are placed in contact therewith, the molybdenum disulphide is uniformly distributed over the runner and shaft surfaces exposed to the bearing to provide a lubricating film effective in minimizing wear of the carbon when the bearing is operated under low humidity conditions, and at least one groove in said shell and thrust bearing surfaces for collecting particles of carbon and molybdenum disulphide which wear from the surfaces of the combined bearing during operation.

References Cited in the file of this patent

UNITED STATES PATENTS

| | | |
|---|---|---|
| 379,531 | Douglas | Mar. 13, 1888 |
| 1,174,941 | Bache | Mar. 7, 1916 |
| 1,498,578 | Romano | June 24, 1924 |
| 1,563,663 | Seabury | Dec. 1, 1925 |
| 1,958,089 | Leis et al. | May 8, 1934 |
| 2,517,233 | Peters | Aug. 1, 1950 |
| 2,627,443 | Becker | Feb. 3, 1953 |
| 2,733,968 | Delz et al. | Feb. 7, 1956 |
| 2,777,081 | Miner | Jan. 8, 1957 |
| 2,870,353 | Shobert | Jan. 20, 1959 |
| 2,946,907 | Titus | July 26, 1960 |

FOREIGN PATENTS

| | | |
|---|---|---|
| 677,240 | Great Britain | Aug. 13, 1952 |